Mar. 20, 1923.
A. M. SEARLES.
POPPET VALVE AND THE METHOD OF MAKING IT.
FILED FEB. 10, 1921.

1,448,873.

Inventor
Aaron M. Searles
By Jones Rain & Hinkle
Atty's.

Patented Mar. 20, 1923.

1,448,873

UNITED STATES PATENT OFFICE.

AARON M. SEARLES, OF CHICAGO, ILLINOIS.

POPPET VALVE AND THE METHOD OF MAKING IT.

Application filed February 10, 1921. Serial No. 443,939.

*To all whom it may concern:*

Be it known that I, AARON M. SEARLES, a citizen of the United States, residing at Chicago, in the county of Cook and State of Illinois, have invented certain new and useful Improvements in Poppet Valves and the Methods of Making Them, of which the following is a specification.

The invention relates to improvements in poppet valves and the method of making them.

One of the objects of the invention is to reduce the cost of manufacture of such valves.

Another object is to join the valve disk and stem in a manner to uniformly align the valve seat at exactly right angles with the axis of the stem and the provision of a joint having large superficial contacting surfaces to hold the parts in true alignment regardless of variations in expansion and contraction of the parts under relatively high temperatures.

Other, further and more specific objects of the invention will become readily apparent, to persons skilled in the art, from a consideration of the following description, when taken in conjunction with the accompanying drawings, wherein:—

In all of the views the same reference characters are employed to indicate similar parts.

Figure 1:
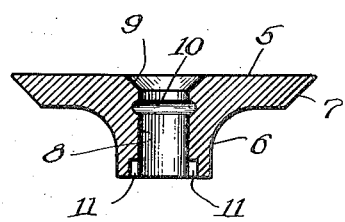
Fig. 1 is a diametric section through the valve disk.

There is no better metal of which the disk of a poppet valve may be made than a good grade of close grain cast iron and there is no metal so poorly adapted for the stem. For this reason a valve of the highest standard of excellence cannot be made of a single piece of metal.

The problem to be solved is how shall the two parts satisfactorily be joined to withstand the vicissitudes of service to which they will inevitably be subjected? To thread the two parts and screw them together has proven to be entirely inadequate because the impact of the valve upon its seat loosens its contact with the stem and in course of time the relative rotation of the parts will cause their separation, further- more, such a method is expensive and inaccurate.

The new method of joining the valve disk to the stem has proven to be all that could be desired, being inexpensive, uniformly accurate and durable.

In the drawing 5 is a disk having a hub 6 and a seating surface 7. The valve is centrally bored, as at 8, and the upper end of the bore is, preferably, countersunk, as at 9. A groove 10 is made in the bore, preferably, near the countersunk end and near the other end of the bore 8 is one or more notches 11 to receive a projection or an equal number of projections 12 that extend laterally from the upper end of the stem 13.

Figure 3:
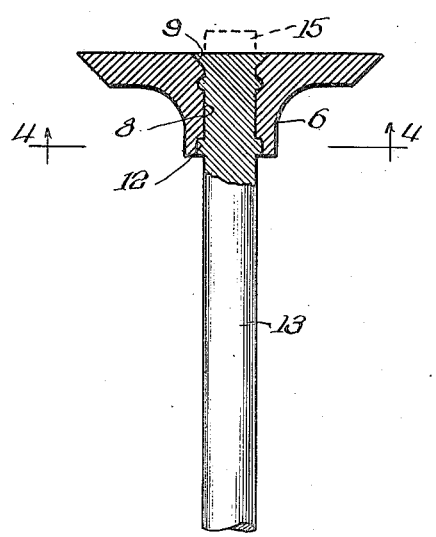
Fig. 3 shows the disk and stem joined together.
Figure 2:
Fig. 2 shows a valve stem in elevation ready to be inserted and held in the disk.
Figure 4:
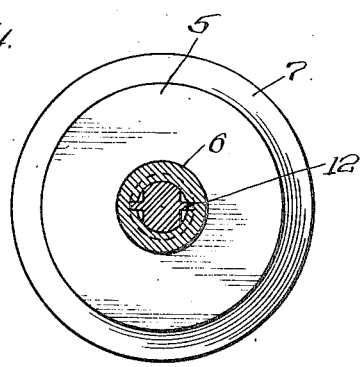
Fig. 4 shows a section taken on line 4—4 of Fig. 3.

The projections 12 are made in the stem by pushing a small amount of metal out of the body part of the stem, as shown more clearly in Fig. 4. The part 14 of the stem is a driving fit for the bore 8 of the valve and the projections are made spaced away from the end 14 of the stem to permit a part 15—shown in dotted lines in Fig. 3—to extend beyond the upper face of the valve disk for the purpose intended.

After the stem has been forced thru the valve, the valve and stem are heated until the end 14 becomes soft and may then be upset. Pressure is then applied to the end 15 to upset it and force the soft metal into the groove 10 and to practically fill the countersink 9. The operation of heating the stem and applying pressure to the soft yielding metal may conveniently be accomplished by use of an electric welding apparatus.

The metal in the groove 10 will prevent relative movement of the valve and stem in either direction and will sufficiently serve without the head provided by the metal in the countersink 9.

Having described my invention what I claim as new and desire to secure by Letters Patent, is:—

1. The method of joining a valve disk and stem which consists in boring the disk thereby providing an opening of uniform diameter for a driving fit with the stem; providing an annular groove extending radially from the bore; inserting a stem into the bore; heating the stem and applying pressure to the heated end of the stem to upset it and to fill the groove.

2. The method of joining a valve disk and stem which consists in boring the disk thereby providing an opening of uniform diameter for a driving fit with the stem; providing an annular groove extending radially from the bore; inserting a stem into the bore permitting a portion to extend therebeyond; providing means on the stem to determine the length of the projecting part; applying heat to the valve and the projecting end of the stem, to soften the stem, then applying pressure to the stem to upset it within the bore to fill the groove extending therefrom.

3. A valve providing a disk having a central bore and a groove therein and having a notch near its lower end in combination with a stem, making a driving fit with the bore and having a projection extending laterally from near its upper end into the notch and a part laterally expanded into said groove.

In testimony whereof I hereunto subscribe my name.

AARON M. SEARLES.